350-3.74 SR

OR 3,833,281

United State

Kumada

[11] 3,833,281

[45] Sept. 3, 1974

[54] HOLOGRAPHIC MEMORY WITH FERROELECTRIC-FERROELASTIC PAGE COMPOSER

[75] Inventor: Akio Kumada, Kodaira, Japan

[73] Assignee: Hitachi, Ltd., Tokyo, Japan

[22] Filed: May 29, 1973

[21] Appl. No.: 364,428

Related U.S. Application Data

[60] Continuation-in-part of Ser. No. 264,468, June 20, 1972, abandoned, which is a division of Ser. No. 15,134, Feb. 27, 1970, Pat. No. 3,684,351.

[30] Foreign Application Priority Data

Mar. 10, 1969 Japan ................................ 44-18168

[52] U.S. Cl. ................................................ 350/3.5
[51] Int. Cl. ............................................ G02b 27/00
[58] Field of Search ....... 350/3.5, 150; 340/173 LT, 340/173 LM, 173 LS

[56] References Cited

UNITED STATES PATENTS

| | | | |
|---|---|---|---|
| 3,530,442 | 9/1970 | Collier et al. | 350/3.5 |
| 3,559,185 | 1/1971 | Burns et al. | 350/150 |
| 3,614,200 | 10/1971 | Taylor | 350/150 |

OTHER PUBLICATIONS

Vitols, IMB Technical Disclosure Bulletin, Vol. 8, No. 11, April 1966, pp. 1581–1583.

*Primary Examiner*—Ronald J. Stern
*Attorney, Agent, or Firm*—Craig & Antonelli

[57] ABSTRACT

A laser holographic memory write-in device comprising a pair of lenses, a pair of polarizers, and a quarter wave plate ($[2n+1]/4$ wave plate) and optical shutter crystal both disposed between said pair of polarizers. This optical shutter crystal is made of a ferroelectric-ferroelastic crystal having $z$-cut end faces the distance between which is arranged to be $[(2n+1)/4]\lambda$, one $z$-plane being provided with a plurality of mutually parallel transparent electrodes, the other $z$-plane being provided with a uniform transparent electrode, so as to apply an electric field at least equal to the coercive electric field of the crystal.

3 Claims, 11 Drawing Figures

HOLOGRAPHIC MEMORY WITH FERROELECTRIC-FERROELASTIC PAGE COMPOSER

CROSS-REFERENCES TO RELATED APPLICATIONS

The present application is a continuation-in-part application of application Ser. No. 264,468 filed June 20, 1972, now abandoned, which is a divisional application of Ser. No. 15,134 filed Feb. 27, 1970, now U.S. Pat. No. 3,684,351.

FIELD OF THE INVENTION

This invention relates to a switching element for a light beam and more particularly to a pattern generator (page composer) in a holographic memory write-in device.

BACKGROUND OF THE INVENTION

To keep pace with the developments in the information industry, the capacities of electronic computing machines have rapidly increased to realize one having a memory capacity of $10^6$ bits. It is further expected that during the next decade, an ultra-large size memory of $10^8$ to $10^{10}$ bits will be available. Conventionally, every bit of desired information is stored in a respective single point in memory space. In other words, one point of a memory space can store only one bit. According to such a system, memories inevitably become large and only one bit of information can be dealt with at a time. Thus, a larger capacity has been accompanied with the consumption of much time and space.

This drawback can be minimized by the use of holography.

Figure 1:
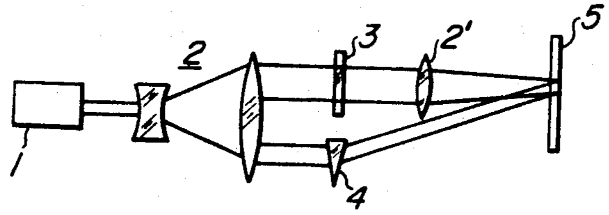
FIG. 1 PRIOR ART
FIG. 1 is a schematic diagram illustrating a prior art holographic memory write-in device.

A holographic memory write-in device comprises a laser beam source 1 for emitting laser beams, a collimating lens system 2 for collimating the laser beams emitted from the source 1, an object (pattern generator) 3 of interest, a Fourier transform lens 2', a deflecting system 4 for deriving reference beams, and a storage medium 5 for storing the interference patterns of the object and the reference beams, as is shown in FIG. 1. The object 3 may be composed of a slide strip having digital data or data patterns are punched therethrough or printed thereon and the storage medium 5 is a photographic film continuously supplied from a reel. The hologram (memory) thus formed on the storage medium 5 is a Fourier transform of the object 3, which is unique to the object and is composed of straight spectral lines in lattice formation.

Figure 2:
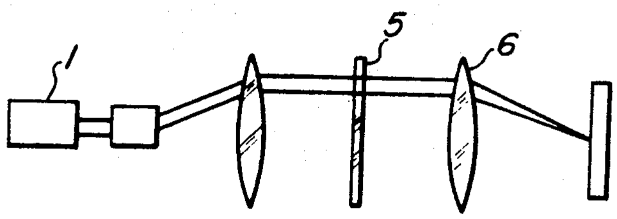
FIG. 2 PRIOR ART
FIG. 2 is a schematic diagram illustrating the manner of reproduction of a hologram pattern obtained by the device of FIG. 1.

Reading-out of the memory can be done, as is shown in FIG. 2, by directing a laser beam from a coherent light source 1 toward an arbitrarily selected portion of the memory medium 5. The laser beam transmitted through the memory 5 is focused by a lens 6 onto a reading-out means (composed of a matrix of several thousands to several tens of thousands of photoelectric converter elements). In the object 3, digital data are selectively stored in periodically disposed spots. In order to store the data more densely in a photographic film, the data sheet is divided into smaller blocks and each block stores the information of one word. Thus, a memory stores a train of small holograms each representing an information word. By such a method, information of $1 \times 10^8$ bits can be stored per 1 $cm^2$ at a maximum.

However, the writing of information of an optical spot pattern composing a hologram has conventionally been effected only for fixed information as by utilizing, for example, punched cards. For example, when information of $10^{12}$ bits is to be written in a storage medium, the information of a two-dimensionally spread optical spot pattern of $10^4$ bits is focused by a lens system to a spot on the storage medium of photosensitive material with a radius of 1 mm and stored thereat. These $10^4$ bits of information can be treated exactly at the same time and thus called a "page" which is a unit of information quantity. The upper limit of pages which can be stored in a single plane of storage medium is considered to be about $10^4$ from the standpoint of the storage medium and optical system and is called volume. Namely, one volume contains information of $10^8$ bits and information of $10^{12}$ bits is stored as $10^4$ volumes. In practice information is written-in page by page so that to write-in information (pattern) of $10^{12}$ bits using punched boards, $10^8$ punched boards become necessary. In addition to the considerable time consumption needed for the exchange of punched boards, more time is also needed to make these punched boards, so the whole period of time becomes very large. For example, even if one board is made in one minute using a photoetching technique, a time of nearly 200 years would be necessary to prepare $10^8$ boards.

Therefore, it is desired to realize an array of more than $10^4$ shutters controllable as required, for a writing-in system of holography.

This optical shutter array (i.e. pattern generator) should satisfy the following conditions:

1. Individual optical shutter elements can be independently operated with respect to the effective quantity of the transmitted light beam (the intensity of the transmitted light may be controlled by phase change for polarized light as well as absorption and reflection) corresponding to the respective information bits;

2. In the case of a system in which switching of the optical shutters (i.e. pattern generator) is electrically controlled, information can be disposed in a matrix array and selected by the voltage or current coincidence method to simplify a selector arrangement;
3. As an accompanying condition to condition 2, the characteristic properties of the optical shutters (i.e. pattern generator) should be controlled independently of each other and have a memory action to the write-in signal; and
4. As another accompanying condition to condition 2, for the voltage coincidence method, the characteristic properties of the said optical shutters (i.e. pattern generator) should have a threshold value for a voltage pulse of a writing-in signal. To summarize conditions 3 and 4, the optical characteristic under control should have a hysteresis property and bi-stability with respect to the write-in signal (for example, the voltage pulse.)

Figure 3:
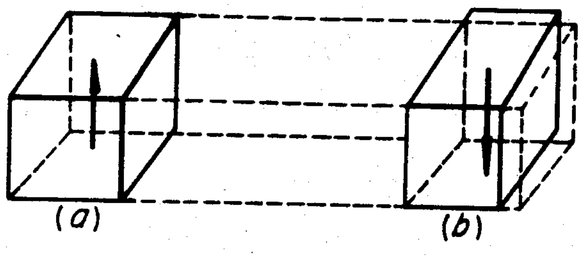
FIG. 3 illustrates the lattice deformation of a ferroelectric-ferroelastic crystal upon polarization reversal.

The present inventor has found that in certain kinds of ferroelectrics, the spontaneous polarization can be reversed and simultaneously $x$ and $y$ axes can be interchanged by the application of an electric field above a certain threshold value (which is called the coercive electric field) or a stress above a certain value (called the coercive stress). This is equivalent to a 90° rotation around the $z$ axis followed by a "mirror reflection". This phenomenon has a storing property. More particularly, the present inventor has found that in certain kinds of ferroelectric substances such as potassium dihydrogen phosphate (which will be referred to as KDP in this specification), gadolinium molybdate (which will be referred to as MOG in this specification) and boracite, the spontaneous polarization can be reversed and the $x$ and $y$ axes can be interchanged by the application of an electric field or stress over their coercive value, as is shown in FIG. 3, being different from ordinary ferroelectrics such as tri-glycine sulfate, lead zirconate titanate, or barium titanate. In FIG. 3, polarization before switching is shown on the left-hand side (a) and that after switching is shown on the right-hand side (b). The present inventor has found that such a phenomenon is observed in certain kinds of ferroelectrics belonging to group mm2 and thus named such ferroelectrics ferroelectric-ferroelastic substance and classified them as group imm2, which belongs to the ferroelectric-ferroelastic species $\bar{4}2$ mF mm2, $\bar{4}3$ mF mm2 and $\bar{6}$ m2F mm2. Such crystals, in the ferroelectric-ferroelastic phase, show birefringence and have mutually different refraction indices $\alpha$, $\beta$ and $\gamma$ for light beams vibrating along the $x$, $y$ and $z$ axes of the crystal, respectively. Taking an MOG single crystal belonging to the group imm2 as an example, refractive indices for the light rays of a wavelength $\mu = 5893$ A vibrating parallel to the $x$, $y$ and $z$ axes are $n_x = 1.8428$, $n_y = 1.8432$ and $n_z = 1.897$, respectively. As is clear from this data, crystals belonging to the group imm2 show birefringence as biaxial crystals. The most important thing in the above-mentioned explanation is that the practicable substances for the 90° rotation of their optical axial planes are only ferroelectric-ferroelastic substances belonging to the species $\bar{4}2$ mF mm2, $\bar{6}$ m2F mm2 and $\bar{4}3$ mF mm2.

Figures 4, 5:
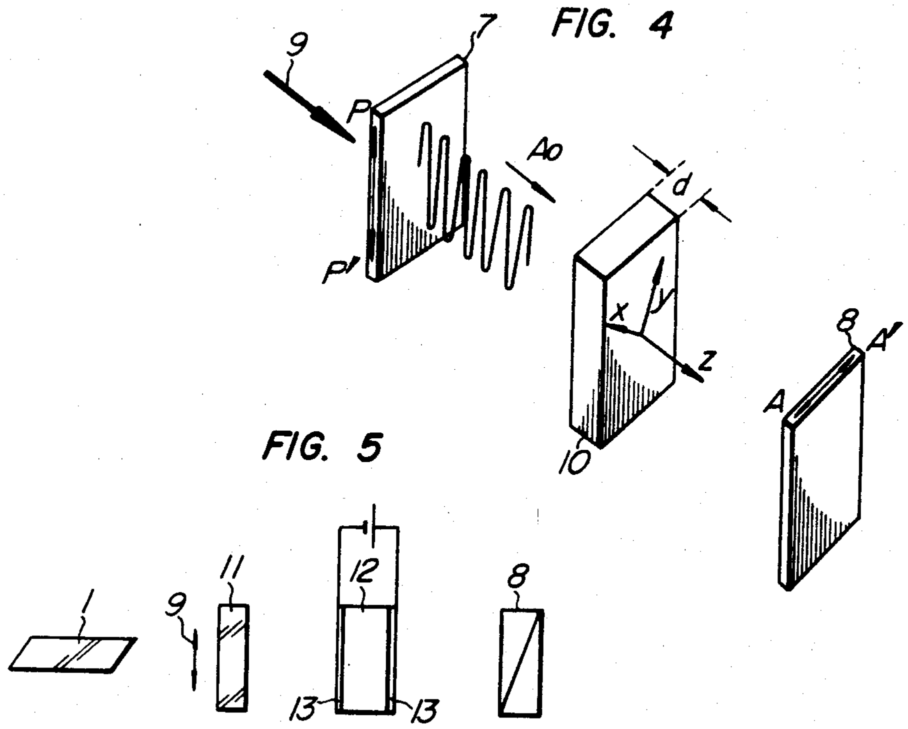
FIG. 4 illustrates the states of a linearly polarized light beam incident upon and transmitted through a Z-plate of a ferroelectric-ferroelastic crystal.
FIG. 5 illustrates the change of polarization-plane (vibration-plane) of a light beam when a linearly polarized light beam is directed toward a conjugate element comprising a quarter wave plate of a ferroelectric-ferroelastic crystal and a fixed quarter wave plate.

As is shown in FIG. 4, a Z-plate of MOG crystal 10 (being cut to have two opposing faces perpendicular to the $z$ axis) is disposed between crossed polarizers 7 and 8 (one polarizer and one analyser) with its optical axis being in diagonal relationship with the vibration planes of the crossed polarizers. Here, the vibration planes of the polarizers 7 and 8 are perpendicular to each other and the surfaces of the polarizers 7, 8 and MOG crystal 10 are parallel to each other. When a beam of white light 9 is directed toward such an arrangement, it becomes a linearly polarized light beam at the polarizer 7, and is then changed to an elliptically, circularly or linearly polarized light beam by the retradation of the transmitted light through the crystal 10, and is finally partially transmitted through the analyser 8. A polarizer or analyser permits such a component of an incident beam which has the same vibration plane as that of the polarizer or analyser to pass therethrough. Thus, an interference color is observed due to the phase difference between the light rays of various wavelengths constituting a white light beam.

When a ferroelectric-ferroelastic crystal belonging to the imm2 group is cut in a cubic shape having planes parallel to crystal axes, polished to possess optically flat surfaces, provided with electrodes on $z$-planes, inserted between crossed polarizers in diagonal position and subjected to an incident beam of white light, an interference color appears according to the thickness of the crystal due to birefringence. This is caused by the phasal difference or retardation of light rays unique to each crystal. Retardation R obeys the equation:

$$R = d \cdot \Delta n$$

where $d$ is the thickness of the crystal through which a light beam passes and $\Delta n$ represents birefringence. In ferroelectric-ferroelastic substances, $x$ and $y$ axes are interchanged upon polarization reversal as is described above. Thus, both the thickness $d$ and birefringence are subjected to a change. That is, letting the retardations corresponding to positive and negative polarization states be R(+) and R(−), R(+) and R(−) can be represented as:

$$R(+) = d_x \cdot (\gamma - \beta)$$
$$R(-) = d_y \cdot (\gamma - \alpha)$$

Since usually $(d_x \sim d_y)/(d_x + d_y) = 0.01 \sim 0.001$ and $(\beta \sim \alpha)/\gamma = 1 \sim 0.1$, the interference color due to birefringence changes upon polarization reversal. Thus, an element which clearly changes the interference color in proportion to thickness can be obtained. However, in the case of an MOG single crystal, $(d_x \sim d_y)/(d_x + d_y) = 1.5 \times 10^{-3}$ and $(\beta \sim \alpha)/\gamma = 2 \times 10^{-2}$ and thus the color does not change very clearly, that is, the color modulation range is not wide when utilizing only retardation due to the birefringence change upon polarization reversal.

This invention eliminates the above drawback and employs a method in which the transmission direction of the incident beam coincides with the direction of the spontaneous polarization, that is the direction of the applied electric field. Therefore, the optical path d and the value of birefringence $(\nu\alpha \sim \nu\beta)$ are both invariable upon polarization reversal. Therefore, light passing through such an element shows a variety of peculiar phenomena in its transmission. Such phenomena and their principles will be described hereinafter.

When an electric field stronger than the coercive electric field is applied to the above-mentioned transparent electrodes of the z-plate of MOG crystal, elliptically polarized light transmitted through the crystal reverses its rotational direction since the spontaneous polarization is reversed and the optical axial plane is rotated through 90°. Thus, the retardations before and after the application of an electric field have the same magnitude, but are of opposite signs.

As is shown in FIG. 5, an optical shutter element is formed by arranging a coherent light source 1 which emits light rays 9 of a wavelength $\lambda_O$, a quarter wave plate 11, a quarter wave plate of MOG single crystal 12 provided with transparent electrodes 13 on z-planes, and an analyser 8 on the optical axis. Here, the coherent light source 1 may be a light source provided with a polarizing plate or a laser source with a Brewster window. The MOG plate 12 may be called a polarization plane rotating element. That is, when a voltage at least equal to the coercive electric field is applied to the plate 12, the double refraction of it and the retardation of the transmitted beam through the plate 12 change their signs. Thus, since retardation $R_O$ of the quarter wave plate 11 and retardation $R_G$ of the MOG plate 12 are equal in magnitude, the total retardation R becomes:

$$R = R_O \pm R_G = 2R_O \text{ or } 0.$$

Thus, the composite structure of the plates 11 and 12 works either as a half wave plate or a plate having no retardation. Here, two plates 11 and 12 should be disposed at a diagonal position with respect to the vibration direction of the incident linearly polarized light beam. When a linearly polarized light beam is transmitted through such a composite structure of a half wave plate, the plane of polarization is rotated by 90°, while, when a light beam is transmitted through a plate of no retardation, the vibration plane receives no variation. Polarization reversal may also be caused by the application of a stress at least equal to the coercive stress.

Capability of rotating the optical axial plane by 90° under the application of an electric field or stress is a unique property of ferroelectric-ferroelastic crystals. Therefore, the above function can be solely achieved with a combination of two quarter wave plates at least one of which is made of a ferroelectric-ferroelastic crystal of group imm2 and the other of which does not perform polarization reversal. We will call such a structure capable of rotating the vibration plane of the incident linearly polarized light beam by the application of an electric field or stress a polarization plane rotating unit.

When a polarizer is disposed to receive a light beam transmitted through a polarization plane rotating unit with the vibration direction perpendicular (or parallel) to that of the latter, an optical shutter is formed, the transmittance I of which is $$I = \sin^2(R/\lambda_O)\pi = 1 \text{ or } 0.$$

Further, the thicknesses of the ferroelectric-ferroelastic plate and the quarter wave plate may not only be a quarter-wavelength but can also be $(2n + 1)/4$ wavelength.

The present inventor has proposed in the above referred to U.S. Pat. No. 3,586,415 a system comprising an MOG single crystal provided with transparent row and column electrodes on the light transmitting planes in which a voltage at least equal to half of the coercive electric field can be applied to each row or column electrode to write polarization reversal in the crystal in correspondence with the external signal by a voltage coincidence method. When a linearly polarized light beam is directed toward a positively or negatively polarized part in such a crystal, the information written thereat can be read out non-destructively since the crystal transmits or shuts off the light beam according to the state of polarization.

In this system, however, transparent matrix electrodes are disposed on the light transmitting planes of a single ferroelectric-ferroelastic quarter wave plate, therefore the effect of polarization reversal occurring at the crossed-over portions of the electrodes extends along the strip regions of the electrodes. Thus, it was difficult to realize such an optical switch by forming electrodes on portions of a crystal plate that effects switching function only on the light beams passing through those portions.

SUMMARY OF THE INVENTION

An object of this invention is to provide an optical shutter (pattern generator) system capable of arbitrarily performing a switching function by accurately causing or not causing desired portions of an optical shutter element to become transparent.

A further object of this invention is to provide a pattern generator comprising the above shutter system which can continuously generate easily and accurately a predetermined information pattern in accordance with a predetermined signal.

Another object of this invention is to provide a holographic memory write-in device of large capacity.

The feature of the optical shutter unit of this invention in achieving the above objects lies in disposing between a pair of polarizing means, a z-plate of ferroelectric-ferroelastic crystal having the crystallographic symmetry of mm2 and a thickness of $(2n + 1)/4\ \lambda$ for a predetermined wavelength $\lambda$ of the incident beam, the z-plate being provided with a plurality of parallel transparent strip electrodes on one of its z-planes, a uniform transparent electrode on the entire area of the other z-plane, and electric means for supplying the z-plate with an electric field at least equal to the coercive electric field of the ferroelectric-ferroelastic crystal through the electrode, and a $(2n + 1)/4\ \lambda$ plate for the wavelength $\lambda$, where $n$ is an arbitrary positive integer or 0.

The pattern generator employed in the present invention consists of two sets of the above-mentioned optical shutter units serially arranged such that the parallel strip electrode of the z-plates of the two sets perpendicularly cross-over each other.

The holographic memory write-in device according to the present invention comprising a coherent light source, a beam splitter for providing a reference light beam from the coherent light emitted by the light source, a pattern display device disposed in the path of the coherent light, a Fourier transform lens disposed behind the pattern display device, a holographic light-sensitive material disposed behind the Fourier transform lens for receiving the pattern displayed by the pattern display device, and light deflecting means disposed in the path of the reference light beam for directing the reference light beam to the light-sensitive material is characterised in that the above-mentioned pattern generator consisting of the two serial sets of the optical shutter units is used as the pattern display device.

DESCRIPTION OF THE PREFERRED EMBODIMENTS

Now preferred embodiments of the invention will hereinbelow be described with reference to FIGS. 6 to 8.

Example 1

Figure 6:
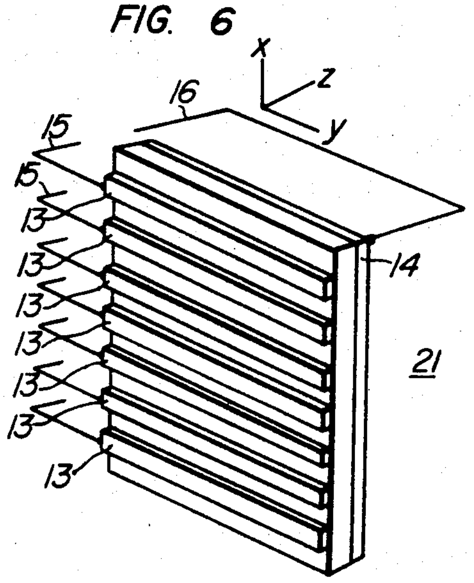
FIG. 6 illustrates how transparent electrodes are formed on a ferroelectric-ferroelastic crystal in the inventive optical shutter.

As is shown in FIG. 6, first a quarter wave plate of a ferroelectric-ferroelastic element is prepared from a $z$-plate of MOG single crystal of dimensions 12 mm × 12 mm × 0.387 mm (a normal to the end planes being [001], or in other words [001] plate) and having another pair of opposing planes cut parallel to the [110] plane. On one of the $z$-planes, a plurality of transparent strip electrodes 13 of tin oxide, $SnO_2$, is formed by an NESA technique (evaporated electrode of $InO_2$ may also be used) in the [110] direction to have a width of 0.5 mm at intervals of 0.5 mm and connected with respective lead wires 15. On the other $z$-plane, a uniform transparent electrode 14 is formed over the whole surface and connected with a lead wire 16. Thus, a ferroelectric-ferroelastic element 21 as shown in FIG. 6 is formed.

Figure 7A:
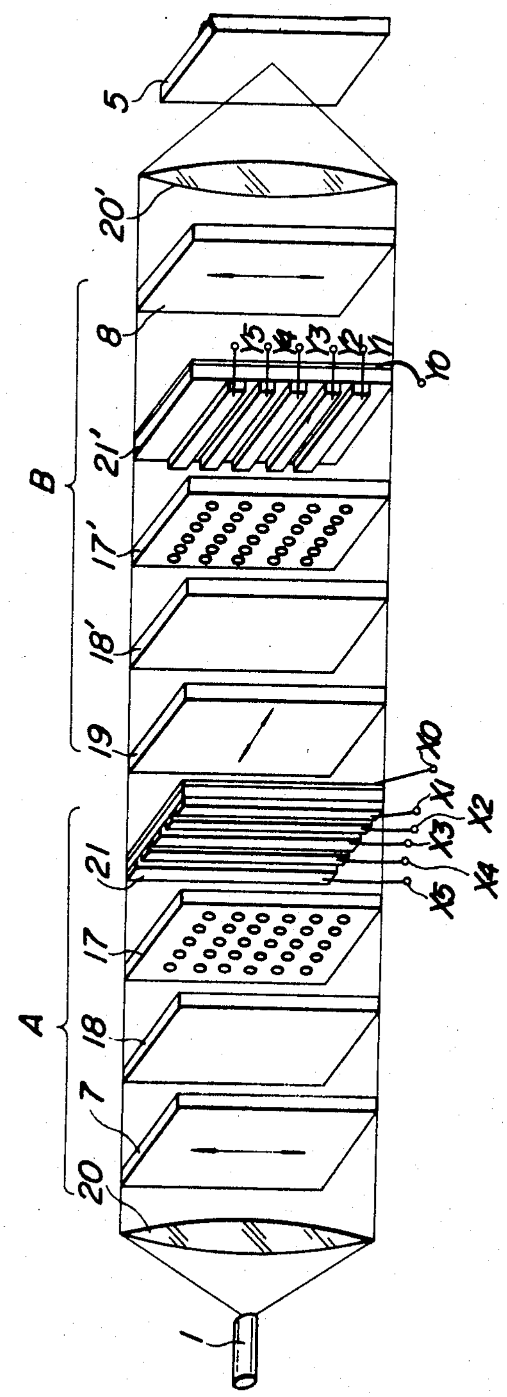
FIG. 7*a* shows the composition of a pattern generator for a holographic memory write-in device of an embodiment of the invention.
Figure 7B:
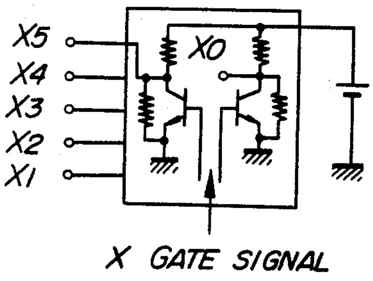
FIGS. 7*b* and 7*c* are circuit diagrams of X- and Y-drivers for applying signals to the optical shutter of FIG. 7*a*, respectively.
Figure 7C:
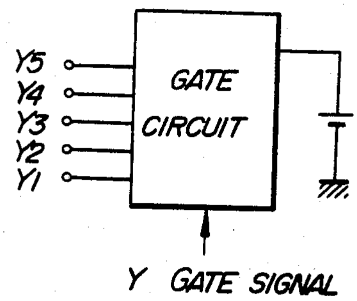

Then, as is illustrated in FIG. 7*a*, between a collimating lens 20 and a ferroelectric-ferroelastic plate 21, a polarizer 7, a quarter wave plate 18 and a shadow mask 17 are disposed in this order in alignment with the element 21 to form an optical shutter unit A (pattern generator unit A). The quarter wave plate 18 is set in a diagonal position relative to the strip electrodes of the element 21. Behind the element 21, an analyser 19, a quarter wave plate 18', a shadow mask 17' and another ferroelectric-ferroelastic element 21' are disposed in this order with the strip electrodes of the element 21' being perpendicular to those of the element 21. Behind the element 21', an analyser 8 is disposed in perpendicular relation to the strip electrodes of the element 21' to form an optical shutter unit (pattern generator unit) B and finally, a focusing lens 20' and a photographic film 5 are disposed there-behind. The elements 21 and 21' are illustrated respectively as provided with five strip electrodes in vertical and horizontal directions in FIG. 7. When a negative voltage is applied to the X-drive lead wires 15 of the element 21 to direct the polarization uniformly in the negative direction, the retardation R of the crystal plate becomes $R = -\frac{1}{4}\lambda_o$ to shut off the incident beam from an He - Ne gas laser 1 in connection with the retardation of the quarter wave plate 18. Then, if a positive voltage is applied to an arbitrary electrode to reverse the spontaneous polarization, the retardation R at the portion of the electrode becomes: $R = +\frac{1}{4}\lambda_o$ and the total retardation of the element 21 and the quarter wave plate 18 becomes $\frac{1}{2}\lambda_o$ as the result of summation to work as a half wave plate. Thus, only the light beam transmitted through this strip portion are transmitted through the analyser 19 to be directed toward the element 21'. Since the electrodes of the element 21' are transverse to those of the element 21, portions of the five electrodes corresponding to said positively polarized portion are irradiated with light rays. The element 21' can be operated in the same manner as that of the element 21, i.e., all of the incident light rays can be shut off or only a desired portion thereof can be transmitted; therefore, information of five bits corresponding to a line in a holographic pattern can be stored in the film 5 at a time. Here, it is to be noted that the polarization under the electrodes are switched independently of each other. The drive voltage was supplied from the drive circuits shown in FIGS. 7*b* and 7*c* and was 150 V for both the positive and negative signals. Switching time was 1 msec and the voltage pulse width was 2 msec. Even after the pulse voltage disappears, the direction of spontaneous polarization that is the state of generated optical pattern can be kept in memorized state. Thus, a holographic pattern is written through the lens 20' in the film 5 to be a spot of 1 mm0 and stored thereat. In this embodiment, since the sensitivity of the photographic film was low, the exposure time was selected to be 100 msec and the element 21 was arranged to be switched from line to line at every 100 msec. Another element 21' was also switched at every 100 msec to generate the pattern of the next line. Repeating these procedures five times, information of $5 \times 5 = 25$ bits were focused onto one spot and written-in. Similar steps were repeated for other spots of the photographic film. Thus, information of about $10^4$ bits could be stored in an area of 2 cm × 2 cm on a photographic film. The density of information could thus be effectively increased.

Description has been made of a pattern generator for use in a file memory utilizing laser hologram hereinbefore. But this invention could be equally used as a topological optical shutter for shutting off unnecessary light rays and for other purposes, for example such as a random access matrix shutter working as a composer of a random access slide in a teaching machine. In such cases in which the number of shutters are small as is the case in the above example, one unit, for example unit B in FIG. 7*a* may be dispensed with. For example, as is shown in FIG. 8, a ferroelectric-ferroelastic crystal corresponding to one row in FIG. 8 is provided with five strip transparent electrodes having dimensions 6 mm × 8 mm into which a transparent sheet 6 mm × 50 mm in size is divided with an interval of 2 to 2.5 mm between each pair of adjacent electrodes to form an unelectroded area, on one side. On the other side, a uniform electrode is formed on the whole surface. Then, lead wires are connected to the respective electrodes. Then, five crystals of such a structure are disposed side by side as is shown in FIG. 8 and on said one side five lead wires connected to the same column are connected in series and led out to form one column. Thus, five columns on the front face and five rows on the back face form a matrix, and a random access matrix shutter is formed in which any one address can be arbitrarily selected by a voltage coincidence method. Although more than one address of the matrix cannot arbitrarily be operated in this system, multi-exposure is possible if the operation is carried out sequentially in time. Thus, this system also has very wide applications.

Example 2

Figure 9:
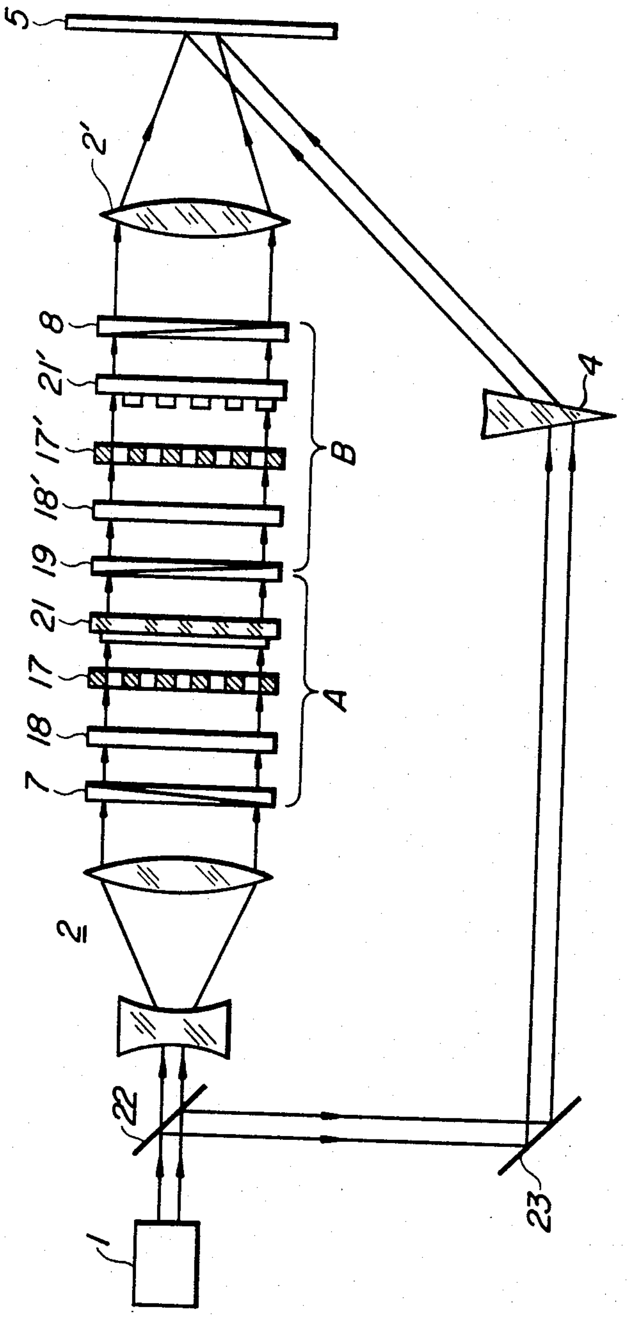
FIG. 9 is a schematic illustration of an embodiment of the holographic memory write-in device according to the present invention.

FIG. 9 shows a holographic memory write-in device according to the present invention comprising a coherent light source, a beam splitter for providing a reference light beam from the coherent light emitted by the light source, a pattern display device composed of a pattern generator consisting of two serial sets of optical shutter units disposed in the path of the coherent light behind the beam splitter, a Foulier transform lens disposed behind the pattern display device, a holographic light-sensitive material disposed behind the Fourier transform lens for receiving the pattern displayed by the pattern display device, and light deflecting means disposed in the path of the reference light beam for directing the reference light beam to the light-sensitive material.

The coherent light emitted by the light source 1 is divided into two parts by the beam splitter 22. One part which is to be used as a reference light is reflected by a reflector 23 and deflected by the light deflector 4 such as a prism to be directed to the holographic light-sensitive material 5. The other part passes through the collimating lens system 2, the light polarizing plates 7, 19, and 8, the quarter-wave plates 18 and 18′, the shadow masks 17 and 17′, the *z*-plates 21 and 21′ of a ferroelectric-ferroelastic material having a thickness of $[(2n + 1)/4]\lambda$, and the Fourier transform lens 2′ and reaches the light-sensitive material 5. Each of the *z*-plates 21 and 21′ has on its one face parallel strip transparent electrodes, and each of the shadow masks 17 and 17′ has digital perforation aligned with the parallel electrode on the z-plate.

In this pattern generator the parallel electrode on the *z*-plate 21 of the optical shutter unit A composed of the light polarizing plate 7, the quarterwave plate 18, the shadow mask 17, the *z*-plate 21, and the light polarizing plate 19 and those of the *z*-plate 21′ of the optical shutter unit B composed of the light polarizing plate 19, the quarter-wave plate 18′, the shadow mask 17′, the *z*-plate 21′, and the light polarizing plate 8 cross-over each other. The light polarising plate 19 may be of two separate light polarizing plates belonging to the separate shutter units A and B, or of a single light polarizing plate common to both shutter units A and B.

To cause the pattern display device composed of the optical shutter units A and B to display a desired pattern, the *z*-plates 21 and 21′ of the ferroelectric-ferroelastic material of the optical shutter units A and B are subjected to an electric field at least equal to their threshold or coercive field through their electrodes. Then, by illuminating the displayed pattern with the coherent light as a material light to direct the pattern to the holographic light-sensitive material 5 and by causing it to interfere with the reference light, the image of the displayed pattern can be written in the holographic light-sensitive material 5 as a holographic memory.

Though in the holographic memory write-in device of FIG. 9 the reference light is divided out of the coherent light emitted by the light source 1 by the beam splitter 22 in front of the collimating lens system 2, it may be divided out of the coherent light behind the collimating lens system 2 as in the prior art holographic memory write-in device shown in FIG. 1.

Figure 8:
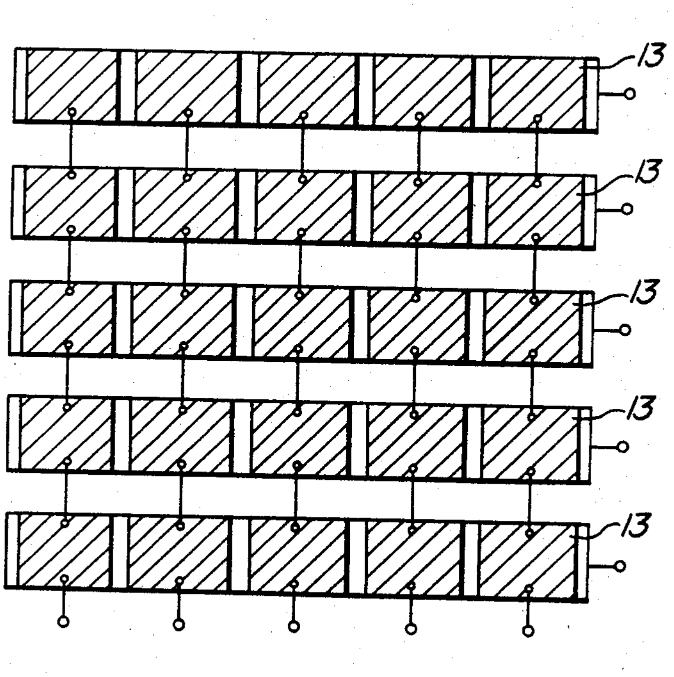
FIG. 8 shows another embodiment of the electrode structure of the optical shutter pattern generator of the invention.

The *z*-plate of each of the optical shutter units A and B can be replaced by that shown in FIG. 8.

As is described above, this invention provides the following advantages:

a. even a monolithic body of a ferroelectric-ferroelastic substance such as an MOG single crystal can be used for a pattern generator, in which polarization reversal due to the application of a coercive electric field can be located only in the limited crossed-over portion of the electrodes on both surfaces so as to enable an accurate writing-in;

b. thus, a pattern generator of a high signal to noise ratio can be obtained, for example when used with a coherent beam and a suitable mask, since unnecessary light does not enter any undesirable portions.

I claim:

1. In a holographic memory write-in device comprising a coherent light source, a collimating lens system disposed in the path of the coherent light emitted by the coherent light source, a pattern display device disposed in the path of the coherent light passing through the collimating lens system, a Fourier transform lens disposed behind the pattern display device, a holographic light-sensitive material disposed behind the Fourier transform lens for receiving a Fourier transform image of the pattern displayed by the pattern display device, a beam splitter for providing a reference light beam from the coherent light, and light deflecting means disposed in the path of the reference light beam for directing the reference light beam to the light-sensitive material; the improvement wherein the pattern display device comprises a pattern generator composed of a pair of optical shutter units each comprising a pair of polarizing means; a *z*-plate of ferroelectric-ferroelastic crystal having the crystallographic symmetry of mm2, disposed between said pair of polarizing means and having a thickness $[(2n+1)/4]\ \lambda$ for a predetermined wavelength $\lambda$ of the incident beam; a plurality of parallel transparent strip electrodes formed on one side of the *z*-plate, a uniform transparent electrode formed on the entire area of the other side of the *z*-plate, and electric means for supplying an electric field at least equal to the coercive electric field of the crystal through said electrodes; and a $[(2n + 1)/4]\ \lambda$ plate for said wavelength where n is an arbitrary positive integer or 0; said optical shutter units being disposed one behind the other in such a manner that said strip electrodes of the two *z*-plates of said units are orthogonal and the back polarizing means of the front optical unit and the front polarizing means of the back optical unit overlap each other.

2. An improved holographic memory write-in device according to claim 1, in which said ferroelectric-ferroelastic crystal is a gadolinium molybdate crystal.

3. An improved holographic memory write-in device according to claim 1, in which each of said optical shutter units comprises a shadow mask disposed between said $[(2n + 1/4)]\ \lambda$ plate and said ferroelectric-ferroelastic crystal and having circular openings arranged to be in registration with said plurality of transparent electrodes.

* * * * *